United States Patent
Bruna et al.

(10) Patent No.: US 7,024,044 B2
(45) Date of Patent: Apr. 4, 2006

(54) METHOD OF COMPRESSING DIGITAL IMAGES

(75) Inventors: Arcangelo Bruna, San Cataldo (IT); Massimo Mancuso, Monza (IT); Agostino Galluzzo, Palma di Montechiaro (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 723 days.

(21) Appl. No.: 09/902,439

(22) Filed: Jul. 10, 2001

(65) Prior Publication Data

US 2002/0041716 A1    Apr. 11, 2002

(30) Foreign Application Priority Data

Jul. 10, 2000    (EP) .................... 00202436

(51) Int. Cl.
G06K 9/36 (2006.01)
(52) U.S. Cl. ..................... 382/239; 382/251
(58) Field of Classification Search ............... 382/239, 382/251, 248, 232, 253, 238; 341/50; 348/231.2, 348/231.9, 231.99, 222.1
See application file for complete search history.

(56) References Cited

U.S. PATENT DOCUMENTS

| | | | |
|---|---|---|---|
| 5,051,840 A * | 9/1991 | Watanabe et al. | 382/239 |
| 5,434,623 A | 7/1995 | Coleman et al. | 348/405 |
| 5,732,156 A * | 3/1998 | Watanabe et al. | 382/239 |
| 6,424,739 B1 * | 7/2002 | Ukita et al. | 382/166 |

FOREIGN PATENT DOCUMENTS

| | | |
|---|---|---|
| EP | 0469648 | 2/1992 |
| EP | 0549470 | 12/1992 |
| EP | 0762775 | 3/1997 |
| EP | 1006731 | 6/2000 |
| WO | 99/60793 | 11/1999 |

OTHER PUBLICATIONS

Compression of Fingerprint Images, IBM Technical Disclosure Bulletin, US, IBM Corp., New York, vol. 35, No. 3, Aug. 1, 1992, p. 356, XP000326300.

Nakagawa et al., DCT-Based Still Image Compression ICS with Bit-Rate Control, IEEE Transactions on Consumer Electronics, US, IEEE Inc., New York, vol. 38, No. 3, Aug. 1, 1992, pp. 711-716, XP000311915.

* cited by examiner

Primary Examiner—Wenpeng Chen
(74) Attorney, Agent, or Firm—Lisa K. Jorgenson; Allen, Dyer, Doppelt, Milbrath & Gilchrist, P.A.

(57) ABSTRACT

A method is for compressing a digital image that is made up of a matrix of elements, with each element including a plurality of digital components of different types for representing a pixel. The method includes splitting the digital image into a plurality of blocks, and calculating for each block a group of DCT coefficients for the components of each type, and quantizing the DCT coefficients of each block using a corresponding quantization table scaled by a gain factor for achieving a target compression factor. The method further includes determining at least one energy measure of the digital image, and estimating the gain factor as a function of the at least one energy measure. The function is determined experimentally according to the target compression factor.

32 Claims, 7 Drawing Sheets

METHOD OF COMPRESSING DIGITAL IMAGES

FIELD OF THE INVENTION

The present invention relates to the field of integrated circuits, and more particularly, to the compression of digital images.

BACKGROUND OF THE INVENTION

Digital images are commonly used in several applications such as, for example, in digital still cameras (DSC). A digital image includes a matrix of elements, commonly referred to as a bit map. Each element of the matrix, which represents an elemental area of the image (a pixel or pel), is formed by several digital values indicating corresponding components of the pixel.

Digital images are typically subjected to a compression process to increase the number of digital images which can be stored simultaneously, such as to a memory of the camera. Moreover, this allows transmission of digital images, such as over the internet, for example, to be easier and less time consuming. A compression method commonly used in standard applications is the JPEG (Joint Photographic Experts Group) algorithm, described in CCITT T. 81, 1992.

In the JPEG algorithm, 8×8 pixel blocks are extracted from the digital image. Discrete cosine transform (DCT) coefficients are then calculated for the components of each block. The DCT coefficients are rounded off using corresponding quantization tables. The quantized DCT coefficients are encoded to obtain a compressed digital image, from which the corresponding original digital image may be later extracted by a decompression process.

In some applications, it is necessary to provide a substantially constant memory requirement for each compressed digital image, i.e., a compression factor control or CF-CTRL. This problem is particularly perceived in digital still cameras. In fact, in this case it must be ensured that a minimum number of compressed digital images can be stored in the memory of the camera to guarantee that a minimum number of photos can be taken by the camera.

The compression factor control is quite difficult in algorithms, such as the JPEG, wherein the size of the compressed digital image depends on the content of the corresponding original digital image. Generally, the compression factor is controlled by scaling the quantization tables using a multiplier coefficient (gain factor). The gain factor to obtain a target compression factor is determined using iterative methods. The compression process is executed several times, at least twice. The gain factor is modified according to the result of the preceding compression process, until the compressed digital image has a size that meets the target compression factor.

Current methods require a high computation time, so that they are quite slow. Moreover, these known methods require a considerable power consumption. This drawback is particularly acute when the compression method is implemented in a digital still camera or other portable devices which are powered by batteries.

SUMMARY OF THE INVENTION

In view of the foregoing background, it is an object of the present invention to overcome the above mentioned drawbacks.

This and other objects, advantages and features in accordance with the present invention are provided by a method of compressing a digital image that includes a matrix of elements, with each element including a plurality of digital components of a different type for representing a pixel. The method may comprise splitting the digital image into a plurality of blocks, and calculating for each block a group of DCT coefficients for the components of each type, and quantizing the DCT coefficients of each block using a corresponding quantization table scaled by a gain factor for achieving a target compression factor.

The method may further comprise determining at least one energy measure of the digital image, and estimating the gain factor as a function of the at least one energy measure. The function may be determined experimentally according to the target compression factor.

Moreover, the present invention also provides a corresponding device for compressing a digital image, and a digital still camera comprising this device.

BRIEF DESCRIPTION OF THE DRAWINGS

Further features and advantages according to the present invention will be made clear by the following description of a preferred embodiment thereof, given purely by way of a non-restrictive example, with reference to the attached figures, in which.

DETAILED DESCRIPTION OF THE PREFERRED EMBODIMENTS

Figure 1:
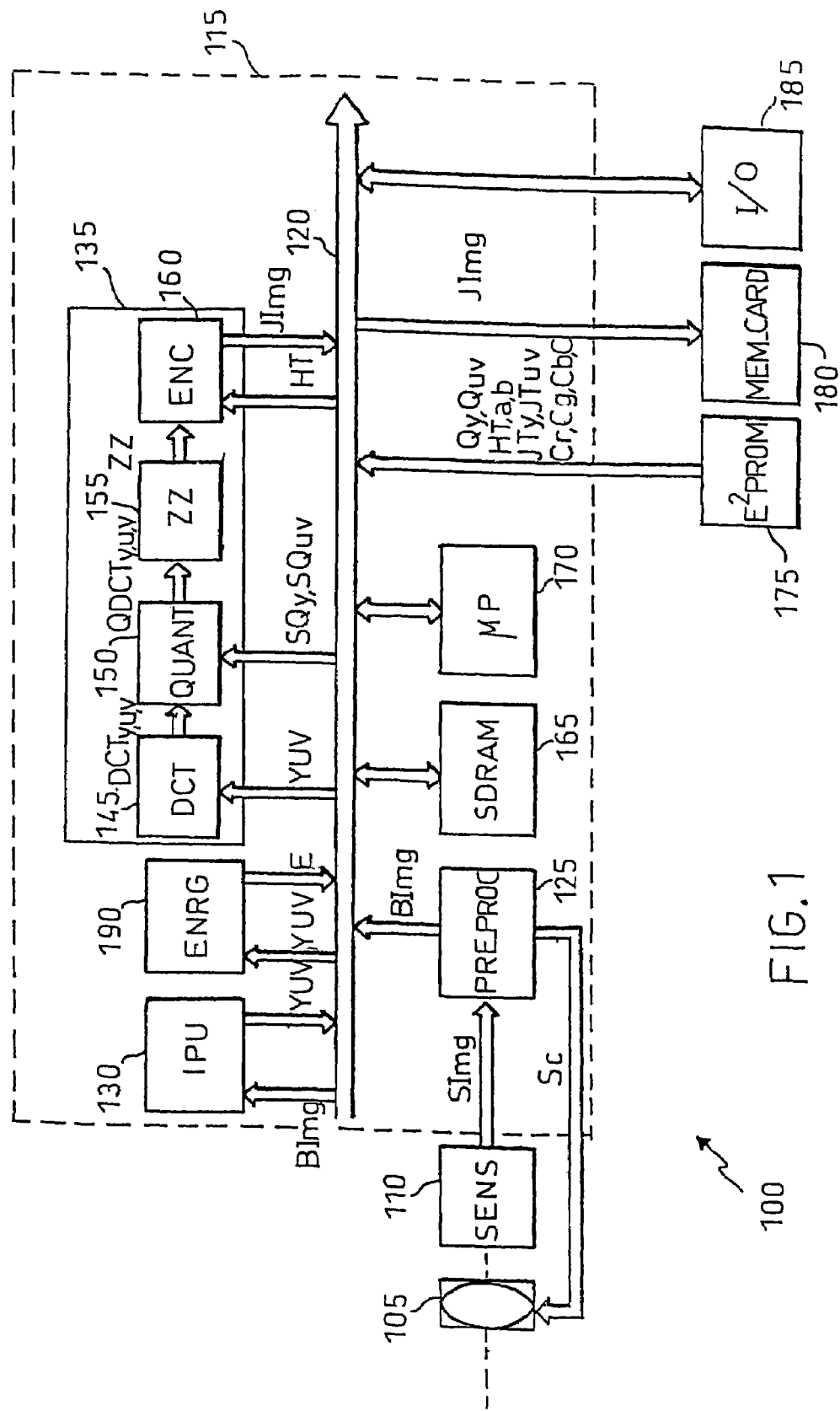
FIG. 1 is a schematic block diagram of a digital still camera for implementing the compression method according to the present invention.

With reference in particular to FIG. 1, a digital still camera (DSC) 100 is illustrated for taking digital images representative of real scenes. A digital image is formed by a matrix with N rows and M columns (for example, 640 rows by 480 columns). Each element of the matrix includes several digital values (for example, three values each one of 8 bits, ranging from 0 to 255) representative of respective optical components of a pixel.

The camera 100 includes an image-acquisition unit 105 formed by a diaphragm and a set of lenses for transmitting the light corresponding to the image of the real scene to a sensor unit (SENS) 110. The sensor unit 110 is typically formed by a charge-coupled device (CCD). A CCD is an integrated circuit which contains a matrix of light-sensitive cells. Each light-sensitive cell generates a voltage, the intensity of which is proportional to the exposure of the light-sensitive cell. The generated voltage is supplied to an analog/digital converter, which produces a corresponding digital value.

To reduce the number of light-sensitive cells, the sensor unit 110 does not detect all the components for every pixel. Typically, only one light-sensitive cell is provided for each pixel. The CCD is covered by a color filter that includes a matrix of filter elements. Each one is associated with a corresponding light-sensitive cell of the CCD. Each filter element transmits (absorbing a minimal portion) the luminous radiation belonging only to the wavelength of red, blue or green light (substantially absorbing the others). This is done to detect a red color component (R), a green color component (G), or a blue color component (B) for each pixel.

In particular, the filter may be of the Bayer type as described in U.S. Pat. No. 3,971,065, in which only the G component is detected for a half of the pixels, in a chessboard-like arrangement. The R component or the B component is detected for the other half of the pixels, in respective alternate rows, as shown in the following Table 1:

TABLE 1

| G | R | G | R | G | R | G | R | G |
|---|---|---|---|---|---|---|---|---|
| B | G | B | G | B | G | B | G | B |
| G | R | G | R | G | R | G | R | G |
| B | G | B | G | B | G | B | G | B |

An incomplete digital image SImg, in which each element includes a single color component (R, G or B), is output by the sensor unit 110.

The camera 100 includes a control unit 115 formed by several blocks which are connected in parallel to a communication bus 120. Particularly, a pre-processing unit (PRE_PROC) 125 receives the incomplete digital image SImg. The pre-processing unit 125 determines various parameters of the incomplete digital image Simg, such as a high-frequency content and an average luminosity. These parameters are used to automatically control a focus (auto-focus) and an exposure (auto-exposure) by corresponding control signals Sc which are supplied to the acquisition unit 105. The pre-processing unit 125 also modifies the incomplete digital image SImg, for example, by applying a white-balance algorithm which corrects the color shift of the light towards red (reddish) or towards blue (bluish) based upon the color temperature of the light source. A corresponding incomplete digital image BImg is output by the pre-processing unit 125 and sent onto the bus 120.

The incomplete digital image BImg is received by an image-processing unit (IPU) 130. The image-processing unit 130 interpolates the missing color components in each element of the incomplete digital image BImg to obtain a corresponding digital image RGB wherein each pixel is represented by the R component, the G component and the B component. The digital image RGB is then processed to improve image quality. For example, the image quality may be improved by correcting exposure problems such as back-lighting or excessive front illumination, reducing a noise introduced by the CDD, correcting alterations of a selected color tone, applying special effects (such as a mist effect), compensating the loss of sharpness due to a γ-correction function (typically applied by a television set). Moreover, the digital image can be enlarged, a desired portion of the image can be zoomed, or the ratio of its dimensions can be changed, for example, from 4:3 to 16:9, and the like.

The digital image RGB is then converted into a corresponding digital image YUV in a luminance/chrominance space. Each pixel of the digital image YUV is represented by a luminance component Y (providing information about the brightness), and two chrominance components Cu and CV for providing information about the hue. The Y,Cu,Cv components are calculated from the respective R,G,B components applying, for example, the following equations:

$$Y=0.299 \cdot R+0.587 \cdot G+0.114 \cdot B$$

$$Cu=-0.1687 \cdot R-0.3313 \cdot G+0.5 \cdot B+128$$

$$Cv=0.5 \cdot R-0.4187 \cdot G-0.0813 \cdot B+128$$

This allows chrominance information to be easily identified in order to discard more chrominance information that luminance information during a following compression process of the digital image, since the human eye is more sensitive to luminance than chrominance. The digital image YUV is sent to the bus 120.

A compression unit 135 is also connected to the bus 120. The compression unit 135 receives the digital image YUV and outputs a corresponding digital image JImg compressed by applying a JPEG algorithm. The compression unit 135 includes a discrete cosine transform (DCT) unit 145, which is input the digital image YUV. Each component of the digital image YUV is shifted from the range 0 . . . 255 to the range −128 . . . +127, to normalize the result of the operation. The digital image YUV is then split into several blocks of 8×8 pixels (640×480/64=4800 blocks in the example). Each block of Y components BLy, each block of Cu components BLu, and each block of Cv components BLv is translated into a group of DCT coefficients DCTy, a group of DCT coefficients DCTu, and a group of DCT coefficients DCTv, respectively, representing a spatial frequency of the corresponding components. The DCT coefficients DCTy,u,v[h,k] (with h,k=0 . . . 7) are calculated using the following formula:

$$DCT_{y,u,v[h,k]} = \frac{1}{4} DhDk \sum_{x=0}^{7} \sum_{y=0}^{7} BLy, u, v[x, y] \cos\frac{(2h+1)x\pi}{16} \cos\frac{(2h+1)y\pi}{16}$$

wherein Dh,Dk=1 √2 for h,k=0 and Dh,Dk=1. The first DCT coefficient of each group is referred to as a DC coefficient, and it is proportional to the average of the components of the group, whereas the other DCT coefficients are referred to as AC coefficients.

The groups of DCT coefficients DCTy,u,v are directly provided to a quantizer (QUANT) 150, which also receives from the bus 120 a scaled quantization table for each type of component. Typically, a scaled quantization table SQy is used for the Y components and a scaled quantization table SQuv is used for both the Cu components and the Cv components. Each scaled quantization table includes an 8×8 matrix of quantization constants. The DCT coefficients of each group are divided by the corresponding quantization constants and are rounded off to the nearest integer. As a consequence, smaller and unimportant DCT coefficients disappear and larger DCT coefficients lose unnecessary precision. The quantization process generates corresponding groups of quantized DCT coefficients QDCTy for the Y component, groups of quantized DCT coefficients QDCTu for the Cu component, and groups of quantized DCT coefficients QDCTv for the Cv component.

These values drastically reduce the amount of information required to represent the digital image. The JPEG algorithm is then a lossy compression method, wherein some information about the original image is finally lost during the compression process. However, no image degradation is usually visible to the human eye at normal magnification in the corresponding de-compressed digital image for a compression ratio ranging from 10:1 to 20:1. This is defined as the ratio between the number of bits required to represent the digital image YUV, and the number of bits required to represent the compressed digital image JImg.

Each scaled quantization table SQy,SQuv is obtained by multiplying a corresponding quantization table Qy,Quv by a gain factor G (determined as set out in the following), that is, SQy=G·Qy and SQuv=G·Quv. The gain factor G is used to obtain a desired target compression factor $bp_t$ of the JPEG algorithm, defined as the ratio between the number of bits of the compressed digital image JImg and the number of pixels. Particularly, if the gain factor G is greater than 1, the compression factor is reduced compared to the one provided by the quantization tables Qy,Quv, whereas if the gain factor G is less than 1 the compression factor is increased.

The quantization tables Qy,Quv are defined so as to discard more chrominance information than luminance information. For example, the quantization table Qy (Table 2) is:

TABLE 2

| 1 | 11 | 10 | 16 | 24 | 40 | 51 | 61 |
|---|---|---|---|---|---|---|---|
| 12 | 12 | 14 | 19 | 26 | 58 | 60 | 55 |
| 14 | 13 | 16 | 24 | 40 | 57 | 69 | 56 |
| 14 | 17 | 22 | 29 | 51 | 87 | 8 | 62 |
| 18 | 22 | 37 | 56 | 68 | 109 | 203 | 77 |
| 24 | 35 | 55 | 64 | 81 | 104 | 113 | 92 |
| 49 | 64 | 78 | 87 | 103 | 121 | 120 | 101 |
| 72 | 92 | 95 | 98 | 112 | 100 | 103 | 99 | and the quantization table Quv (Table 3) is:

TABLE 3

| 1 | 18 | 24 | 47 | 99 | 99 | 99 | 99 |
|---|---|---|---|---|---|---|---|
| 18 | 21 | 26 | 66 | 99 | 99 | 99 | 99 |
| 24 | 26 | 56 | 99 | 99 | 99 | 99 | 99 |
| 47 | 66 | 99 | 99 | 99 | 99 | 99 | 99 |
| 99 | 66 | 99 | 99 | 99 | 99 | 99 | 99 |
| 99 | 66 | 99 | 99 | 99 | 99 | 99 | 99 |
| 99 | 66 | 99 | 99 | 99 | 99 | 99 | 99 |
| 99 | 66 | 99 | 99 | 99 | 99 | 99 | 99 |

Preferably, the quantization constants for the DC coefficients are equal to 1 in both cases. This is done to not lose any information about the mean content of each block, and then to avoid the so-called "block-effect", wherein a contrast is perceivable between the blocks of the de-compressed image.

The groups of quantized DCT coefficients QDCTy,u,v are directly provided to a zig-zag unit (ZZ) 155. The zig-zag unit 155 modifies and reorders the quantized DCT coefficients to obtain a single vector ZZ of digital values. Each quantized DC coefficient (the one of a first group) is represented as the difference from the quantized DC coefficient of a previous group. The quantized AC coefficients are arranged in a zig-zag order so that quantized AC coefficients representing low frequencies are moved to the beginning of the group, and quantized AC coefficients representing high frequencies are moved to the end of the group. Since the quantized AC coefficients representing high frequencies are more likely to be zeros, this increases the probability of having longer sequences of zeros in the vector ZZ, which requires a lower number of bits in a run length encoding scheme.

The vector ZZ is directly provided to an encoder (ENC) 160, which also receives one or more encoding tables HT from the bus 120. Each value of the vector ZZ is encoded using a Huffman scheme, wherein the value is represented by a variable number of bits which is inversely proportional to a statistical frequency of use thereof. The encoder 160 then generates the corresponding compressed digital image JImg (which is sent to the bus 120). The compressed digital image JImg is typically formed by a header followed by the encoded values. If the last encoded value associated with a block is equal to 00, it must be followed by an (variable) End of Block (EOB) control word. Moreover, if an encoded value is equal to a further control word FF (used as a marker), this value must be followed by a 00 value.

The control unit 115 also includes a working memory 165, typically a SDRAM (Synchronous Dynamic Random Access Memory) and a microprocessor (μP) 170, which controls the operation of the device. Several peripheral units are further connected to the bus 120 by a respective interface. Particularly, a non-volatile memory 175, typically a flash EEPROM stores the quantization tables Qy,Quv and the encoding tables HT, and a control program for the microprocessor 170. A memory card (MEM_CARD) 180 is used to store the compressed digital images Jimg. The memory card 185 has a capacity of a few Mbytes, and can store several tens of compressed digital images JImg. At the end, the camera 100 includes an input/output (I/O) unit 185 that includes, for example, a series of push-buttons for enabling the user to select various functions of the camera 100. These push-buttons may include an on/off button, an image quality selection button, a shot button, and a zoom control button. The camera 100 also includes a liquid-crystal display (LCD), for supplying data on the operative state of the camera 100 to the user.

Likewise, considerations apply if the camera has a different architecture or includes different units, such as equivalent communication means, a CMOS sensor, a viewfinder or an interface for connection to a personal computer (PC) and a television set, if another color filter (not with a Bayer pattern) is used, if the compressed digital images are directly sent outside the camera (without being stored onto the memory card), and so on.

Alternatively, considerations also apply if the digital image is converted into another space (not a luminance/chrominance space), the digital image RGB is directly compressed (without being converted), the digital image YUV is manipulated to down-sample the Cu,Cv components by averaging groups of pixels together to eliminate further information without sacrificing overall image quality, or no elaboration of the digital image is performed. Similarly, one or more different quantization tables are used, arithmetic encoding schemes are used, and a different compression algorithm is used, such as a progressive JPEG. Moreover, the compression method of the present invention leads itself to be implemented even in a different apparatus, such as a portable scanner, a computer in which graphic applications are provided, and the like.

In the camera 100, in addition to the known structure described above, an energy unit (ENRG) 190 which receives the digital image YUV from the bus 120 is included. The energy unit 190 determines, as described in detail below, an energy measure Ey, Eu and Ev for each type of component (Y, Cu and Cv, respectively) of the digital image YUV. In other words, values indicative of the high-frequency content of each type of component of the digital image YUV are determined. A total energy measure E=Ey+Eu+Ev is then calculated and sent to the bus 120.

The gain factor G for obtaining the target compression factor $bp_t$ is a function of one or more energy measures of the digital image YUV, which is the total energy measured E in the example. The function depends on the target compression factor $bp_t$ in addition to the characteristics of the camera 100, such as the dimension of the CCD, the size of the digital image, and the quantization tables used. The function may be determined a priori by a statistical analysis.

More generally, as described in detail in the following, the present invention includes the steps of determining at least one energy measure of the digital image, and estimating the gain factor as a function of the at least one energy measure. The function is determined experimentally according to the target compression factor.

The method of the invention is very fast, in that the operations performed by the compression unit (i.e., the compression of the digital image) are executed only once. The approach according to the present invention is particularly advantageous in portable devices supplied by batteries, even if different applications are not excluded, since it drastically reduces the power consumption.

These results are achieved with a low error, on the order of a few units, between the target compression factor $bp_t$ and a compression factor $bp_a$ actually obtained, defined as $(bp_t - bp_a)/bp_t$. Experimental results on the illustrated camera provided a mean error of −0.6%. The negative error is more important than the positive error because the size of the compressed digital image is bigger than the target one, with a distribution of 68% between ±6% and 82% between ±10%.

In a preferred embodiment of the present invention, a first estimate is made of the number of bits ACbits required to encode (in the compressed digital image JImg) the AC coefficients of all the groups quantized using the tables Qy,Quv scaled by a pre-set factor S. The number ACbits is estimated as a function of the one or more energy measures determined a priori by a statistical analysis.

Figure 2A:
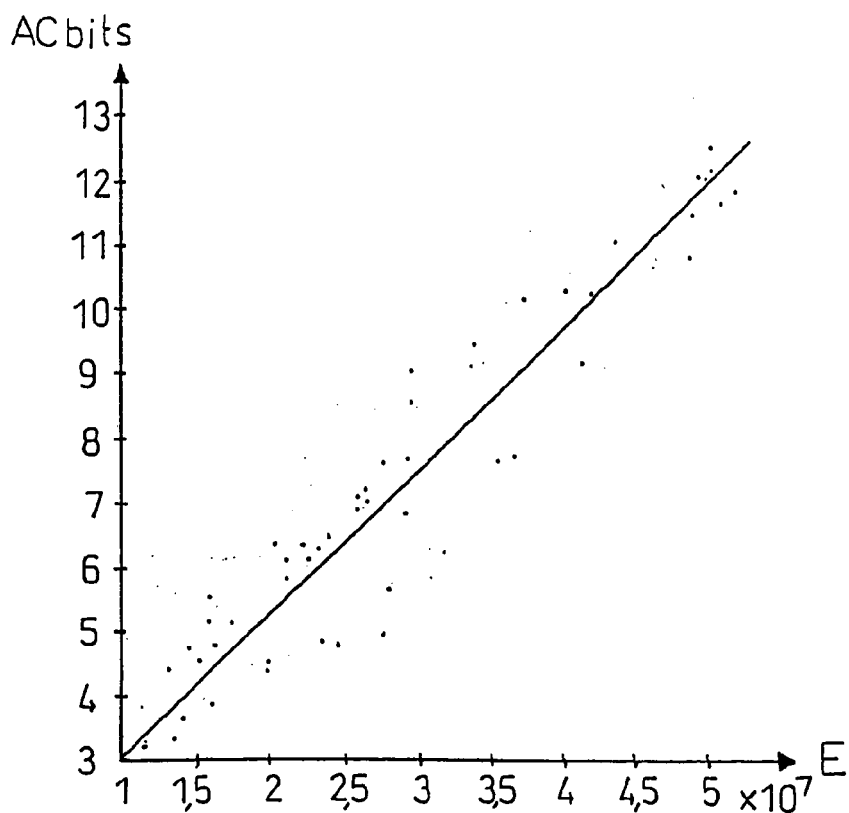
FIGS. 2a and 2b are plots respectively illustrating an example of the relation between the energy/number of bits required to encode AC coefficients, and the basic relation between the compression factor/gain factor.

For example, FIG. 2a shows a relation between the total energy measure E and the number ACbits for a camera having a COD with 1 million of light-sensitive cells and for images of 640×480 pixels, with a factor S=0.2 and a target compression factor $bp_t$=2 bit/pel. This relation can be interpolated as a linear function. In other words, the number ACbits can be estimated using the relation ACbits =a·E+b. The parameters a and b depend on the characteristics of the camera 100 and the target compression factor $bp_t$.

The DC coefficient DCy,u,v of each group is equal to the mean value of the components of the respective block BLy,u,v, that is:

$$DCy, u, v = \frac{1}{64}\sum_{h=0}^{7}\sum_{k=0}^{7} BLy, u, v[h, k]$$

The quantized DC coefficients QDCy,u,v are calculated by dividing the DC coefficients DCy,u,v by the corresponding quantization constants and rounding off the result to the nearest integer. In the example, wherein the quantization constants for the DC coefficients are equal to 1, the quantized DC coefficients QDCy,u,v are the integer part of the respective DC coefficients DCy,u,v, that is, QDCy,u,v=INT[DCy,u,v].

Each quantized DC coefficient is represented in the vector ZZ as the difference DiffQDCy,u,v from the quantized DC coefficient of a previous group. The number of bits DiffDCbits required to encode (in the compressed digital image JImg) each DiffQDCy,u,v value is defined in the JPEG standard by the following table Jty (Table 4), for the Y components:

TABLE 4

| DiffQDCy | DiffDCbits |
|---|---|
| 1 | 2 |
| −1 . . . +1 | 4 |
| −3 . . . −2, +2 . . . +3 | 5 |
| −7 . . . −4, +4 . . . +7 | 6 |
| −15 . . . −8, +8 . . . +15 | 7 |
| −31 . . . −16, +16 . . . +31 | 8 |
| −63 . . . −32, +32 . . . +63 | 10 |
| −127 . . . −64, +64 . . . +127 | 12 |
| −255 . . . −128, +128 . . . +255 | 14 |
| −511 . . . −256, +256 . . . +511 | 16 |
| −1023 . . . −512, +512 . . . +1023 | 18 |
| −2047 . . . −1024, +1024 . . . +2047 | 20 | and by the following table Jtuv (Table 5), for the Cu,Cv components:

TABLE 5

| DiffQDCu,v | DiffDCbits |
|---|---|
| 0 | 2 |
| −1 . . . +1 | 3 |
| −3 . . . −2, +2 . . . +3 | 4 |
| −7 . . . −4, +4 . . . +7 | 6 |
| −15 . . . −8, +8 . . . +15 | 8 |
| −31 . . . −16, +16 . . . +31 | 10 |
| −63 . . . −32, +32 . . . +63 | 12 |
| −127 . . . −64, +64 . . . +127 | 14 |
| −255 . . . −128, +128 . . . +255 | 16 |
| −511 . . . −256, +256 . . . +511 | 18 |
| −1023 . . . −512, +512 . . . +1023 | 20 |
| −2047 . . . −1024, +1024 . . . +2047 | 22 |

The number of bits DCbits required to encode in the compressed digital image JImg the quantized DC coefficients of all the groups is then calculated by summing the values DiffDCbits.

The number of bits HDbits required to represent the header of the compressed digital image JImg is fixed. The number of EOB control words is assumed equal to the number of blocks, and the number of bits CTbits required to represent the EOB control words is then estimated by the formula 8·N·M/64=N·M/8. The number of bits required by the values 00 following the encoded values equal to the marker FF cannot be estimated a priori, and it is set to a default value, which is preferably 0.

Therefore, it is possible to estimate a basic compression factor $bp_b$ obtained using the quantization tables Qy,Quv scaled by the factor S. The basic compression factor $bp_b$ is estimated applying the relation $bp_b$ =(HDbits+DCbits+ACbits+CTbits)/(N·M).

Figure 2B:
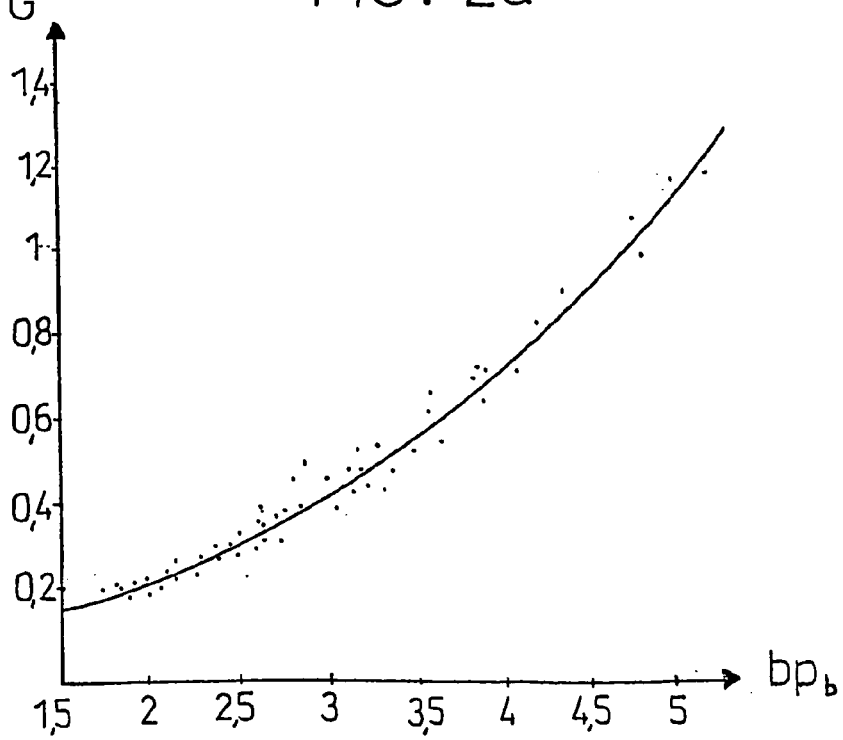

The gain factor G for obtaining the target compression factor $bp_t$ is then estimated as a function of the basic compression factor $bp_b$, determined a priori by a statistical analysis. For example, FIG. 2b shows a relation between the basic compression factor $bp_b$ and the gain factor G for obtaining a compression factor of 2 bit/pel for the same camera. This relation can be interpolated as a quadratic function. In other words, the gain factor G can be estimated using the relation $G=C_2 \cdot bp_b^2 + C_1 \cdot bp_b + C_0$. The parameters C2, C1 and C0 are depend on the characteristics of the camera 100 and the target compression factor $bp_t$.

This approach is particularly straight forward and provides good accuracy. The parameters a,b and the tables JTy,JTuv are stored in the EEPROM 175. Preferably, two or more sets of parameters C2,C1,C0, each one associated with a different value of the target compression factor $bp_t$ and with a different size of the digital image, are determined a priori by a statistical analysis. A look-up table, wherein each row addressable by the value of the target compression factor $bp_t$ contains the respective parameters C2,C1,C0, is also stored in the EEPROM 175. This feature allows different compression factors to be easily selected by the user.

Advantageously, the factor S is determined a priori by a statistical analysis to further reduce the error between the target compression factor $bp_t$ and the actual compression factor $bp_a$. Experimental results have shown that the factor S, which minimizes the error, also depends on the target compression factor $bp_t$ in addition to the characteristics of the camera 100.

Likewise, considerations apply if the compressed digital image has a different format, if the number CTbits and the number of bits required by the values 00 following the encoded values equal to the marker FF are set to different values (such as some tens of bits), and the like. Alternatively, the gain factor is estimated directly from the energy measures, the relation ACbits/E and the relation $G/bp_b$ are interpolated with different functions (such as a logarithmic function), the look-up table is stored elsewhere or a different memory structure is used, only one set of parameters C2,C1, C0 is stored, the linear and quadratic functions are implemented by software, the factor S is set to a constant value, even equal to 1 irrespective of the target compression factor $bp_t$, and the like.

Figure 3:
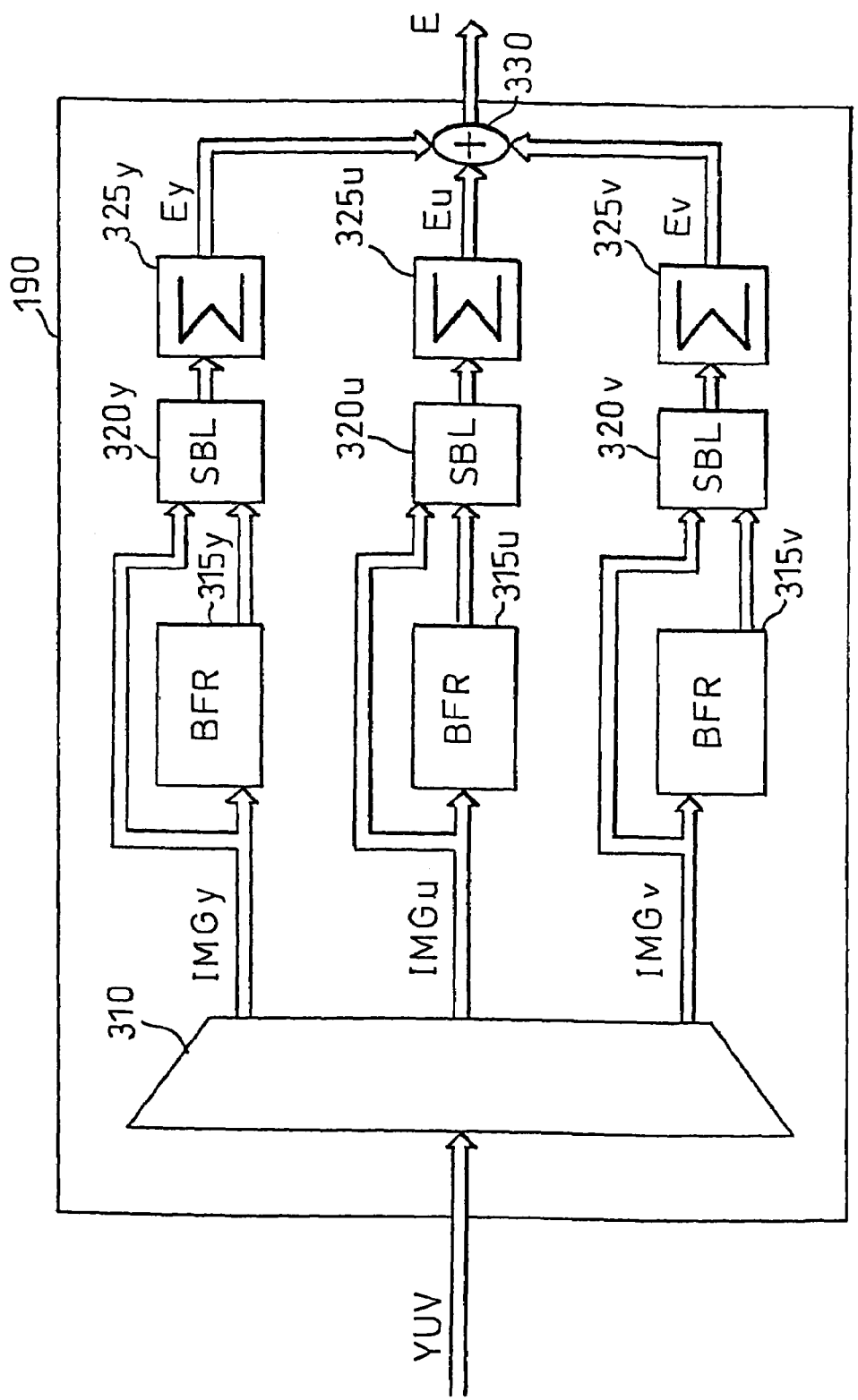
FIG. 3 is a schematic block diagram of an energy unit of the digital still camera according to the present invention.

Considering now FIG. 3, the energy unit 190 includes a demultiplexer 310 with one input and three outputs. The demultiplexer 310 receives the digital image YUV and transfers the components of each type to a respective output according to a selection command not shown in the figure. As a consequence, the digital image YUV is split into a luminance component image IMGy, a Cu chrominance component image IMGu, and a Cv chrominance component image IMGv.

The component images IMGy, IMGu and IMGv are supplied to a buffer (BFR) 315$y$, 315$u$, and 315$v$, respectively. A Sobel filter (SBL) 320$y$, 320$u$ and 320$v$ is also provided for each type of component. The Sobel filter 320$y$,320$u$,320$v$ receives the component image IMGy, IMGu,IMGv directly from the demultiplexer 310, and the component image IMGy,IMGu,IMGv output by the buffer 315$y$,315$u$,315$v$ at respective inputs. An output of each Sobel filter 320$y$, 320$u$ and 320$v$ is provided to a respective accumulator 325$y$, 325$u$ and 325$v$, which outputs the corresponding energy measure Ey, Eu and Ev. The energy measures Ey,Eu,Ev are supplied to a summing node 330, which outputs the total energy measure E.

Each Sobel filter 320$y$,320$u$,320$v$ calculates a horizontal Sobel image SHy,SHu,SHv and a vertical Sobel image SVy,SVu,SVv by a convolution of the component image IMGy,IMGu,IMGv with a horizontal mask Mh and a vertical mask Mv, respectively. The horizontal mask Mh used to detect horizontal outlines of the image is:

| -1 | -2 | -1 |
|----|----|----|
| 0  | 0  | 0  |
| 1  | 2  | 1  |

The vertical mask Mv used to detect vertical outlines of the image is:

| -1 | 0 | 1 |
|----|---|---|
| -2 | 0 | 2 |
| -1 | 0 | 1 |

In other words, each element of the horizontal Sobel images SHy,u,v[i,j] and each element of the vertical Sobel images SVy,u,v[i,j] (with i=0 . . . N−1 and j=0 . . . M−1) are calculated by the following formulas:

$$SHy, u, v[i, j] = \sum_{a=-1}^{+1} \sum_{b=-1}^{+1} IMGy, u, v[i+a, j+b] \cdot Mh[a, b]$$

$$SVy, u, v[i, j] = \sum_{a=-1}^{+1} \sum_{b=-1}^{+1} IMGy, u, v[i+a, j+b] \cdot Mv[a, b]$$

Each Sobel filter 320$y$,320$u$,320$v$ then calculates a total Sobel image Sy,Su,Sv defined by the formula:

Each Sobel filter 320$y$, 320$u$, 320$v$ then calculates a total Sobel image Sy,Su,Sv, defined by the formula:

$Sy=SHy+\alpha \cdot SVy$ $Su=SHu+SVu$ $Sv=SHy+SVv$ wherein the parameter a is used to compensate for the asymmetry of the quantization table Qy along a horizontal and a vertical direction (for example α=0.6). The accumulator 325$y$, 325$u$, 325$v$ suns these values and set the respective energy measure Ey,Eu,Ev equal to this sum, in other words:

$$Ey, u, v = \sum_{i=0}^{N} \sum_{j=0}^{M} |Sy, u, v[i, j]|$$

The summing node 330 then calculates the total energy measure E=Ey+Eu+Ev.

This approach provides good accuracy, without requiring a too lengthy computing time. However, the approach of the present invention can also be implemented without: any compensation parameter, using different masks, a different method for estimating the energy measures, such activity measures, Laplacian or other high-pass filters, using several energy measures such as the energy measures Ey, Eu and Ev, and the like.

To explain the operation of the camera, reference is made to FIGS. 4$a$–4$b$ together with FIG. 1. When the camera 100 is switched on by the user via the on/off button, the microprocessor 170 runs the control program stored in the EEPROM 175. A method 400 corresponding to this control program starts at block 405 and then passes to block 410, wherein the user selects the desired quality of the image, such as low or high, by acting on the corresponding button. The microprocessor 170 determines and stores in the SDRAM 165 the target compression factor $bp_t$ corresponding to the selected image quality, for example, 1 bit/pel for the low quality and 2 bit/pel for the high quality.

The method checks at block 415 if the shot button has been partially pressed to focus the image. If not, the method returns to block 410. As soon as the user partially presses the shot button, the method proceeds to block 420, wherein the incomplete digital image SImg is acquired by the sensor unit 110. The diaphragm is always open and the light is focused by the lenses, through the Bayer filter, onto the CCD. The pre-processing unit 125 then controls the acquisition unit 115 by the control signals Sc according to the content of the incomplete digital image SImg.

The method checks again the status of the shot button at block 425. If the shot button has been released, the method returns to block 410, whereas if the shot button has been completely pressed to take a photo the method continues to block 430. On the other hand, if no action is performed by the user, the method stays in block 425 in an idle loop.

Considering now block 430, the incomplete digital image SImg is acquired by the sensor unit 110 and modified by the pre-processing unit 125. The corresponding incomplete digital image BImg is stored onto the SDRAM 165. The method then passes to block 435, wherein the incomplete digital image BImg is read from the SDRAM 165 and provided to the image-processing unit 130. The image-processing unit 130 interpolates the missing color components in each element of the incomplete digital image BImg to obtain the corresponding digital image RGB, and modifies the digital image RGB to improve the image quality. The digital image RGB is then converted into the corresponding digital image YUV, which is sent to the bus 120.

At this point, the method splits into two branches which are executed concurrently. A first branch includes block 438, and a second branch includes blocks 440–450. The two branches are joined at block 455.

Considering now block 438, the digital image YUV is stored in the SDRAM 165. At the same time, the digital image YUV is also received by the energy unit 190 at block 440. The energy unit 190 estimates the total energy measure E, which is sent to the bus 120. The method proceeds to block 441, wherein the microprocessor 170 receives the total energy measure E and estimates the number of ACbits required to encode the AC coefficients using the parameters a, b read from the EEPROM 175. Continuing to block 442, the microprocessor 170 calculates the number of DCbits required to encode the DC coefficients using the tables JTy,JTuv read from the EEPROM 175.

The method passes to block 443, wherein the microprocessor 170 calculates the number of HDbits required to represent the header of the compressed digital image JImg, and the number of CTbits required to represent the EOB control words. The microprocessor 170 then calculates, at block 445, the basic compression factor $bp_b$ by dividing the sum of the numbers ACbits, DCbits, HDbits and CTbits by the number of pixels of the digital image YUV (N·M). Continuing now to block 450, the microprocessor 170 reads the parameters C2,C1,C0 associated with the target compression factor $bp_t$ from the EEPROM 175, while addressing the look-up table by the value of the target compression factor $bp_t$. The microprocessor 170 then estimates the gain factor G for obtaining the target compression factor $bp_t$ using the read parameters C2,C1,C0.

At the end, the method passes to block 455, wherein the digital image YUV is read from the SDRAM 185 and is provided to the DCT unit 140 which calculates the groups of DCT coefficients DCTy,u,v. Proceeding to block 460, the microprocessor 170 reads the quantization tables Qy,Quv from the EEPROM 175 and calculates the scaled quantization tables SQy,SQuv multiplying the respective quantization tables Qy,Quv by the gain factor G. Continuing to block 465, the groups of DCT coefficients DCTy,u,v and the scaled quantization tables SQy,SQuv are provided to the quantizer 150, which generates the corresponding groups of quantized DCT coefficients QDCTy,u,v.

The method proceeds to block 470, wherein the quantized DCT coefficients QDCTy,u,v are transformed into the vector ZZ by the zig-zag unit 155. The vector ZZ is provided to the encoder 160 at block 475, which generates the corresponding compressed digital image JImg. The compressed digital image JImg is then stored in the SDRAM 165. Continuing to block 480, the compressed digital image JImg is read from the SDRAM 165 and sent to the memory card 180.

The method checks at block 485 if a stop condition has occurred, for example, if the user has switched off the camera 100 via the on/off button, or if the memory card 180 is full. If not, the method returns to block 410. On the other end, the method ends at block 490.

The preferred embodiment of the present invention described above, with the energy measure function being implemented in hardware and the basic compression factor and gain factor estimation function being implemented in software, is a good trade-off between speed and flexibility.

Likewise, considerations apply if the program executes a different equivalent method, for example with error routines, with sequential processes, and the like. In any case, the method of the present invention leads itself to be carried out even with all the functions completely implemented in hardware or in software.

Figure 4A:
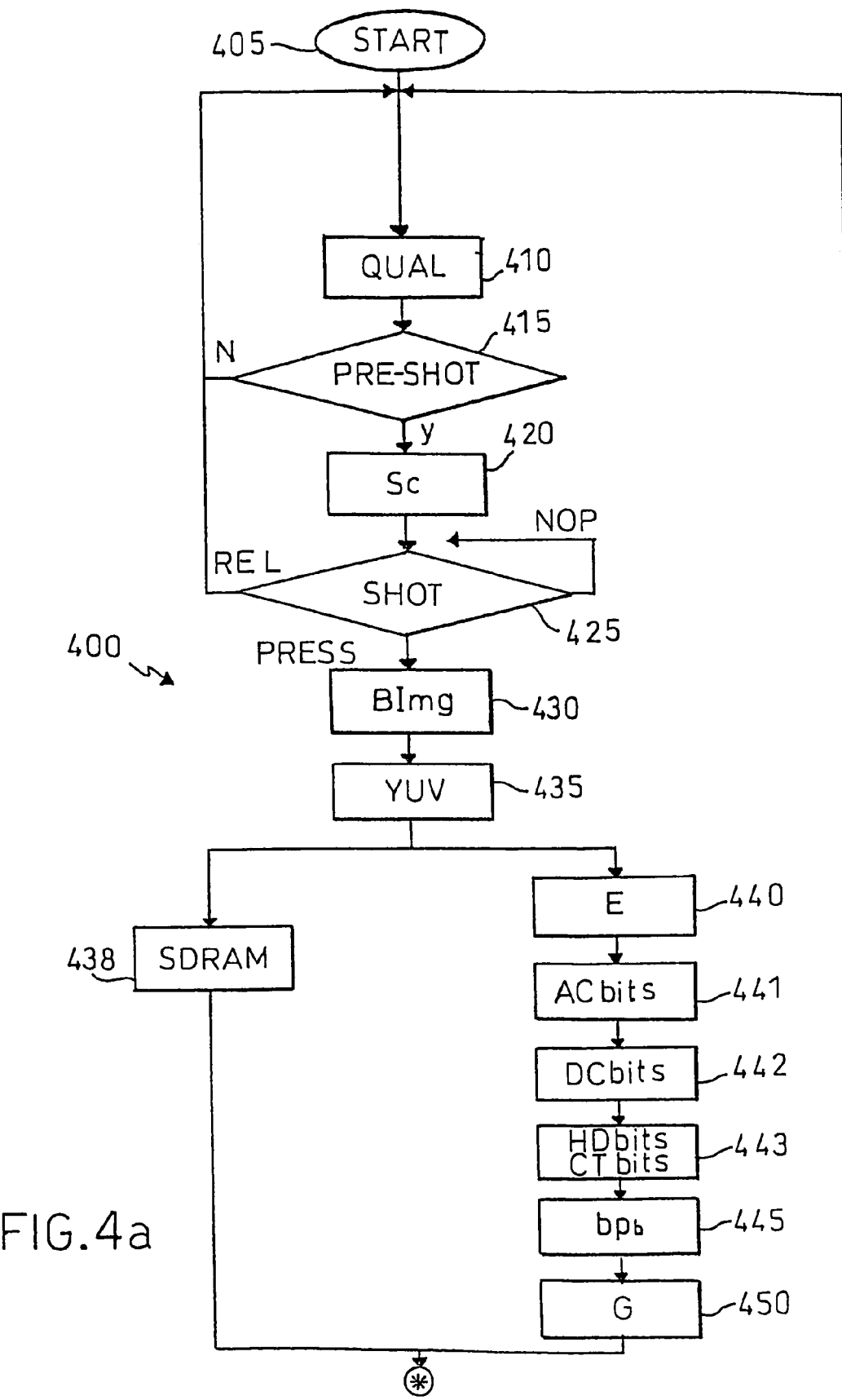
FIGS. 4a–4b are flow charts illustrating the compression method according to the present invention.
Figure 4B:
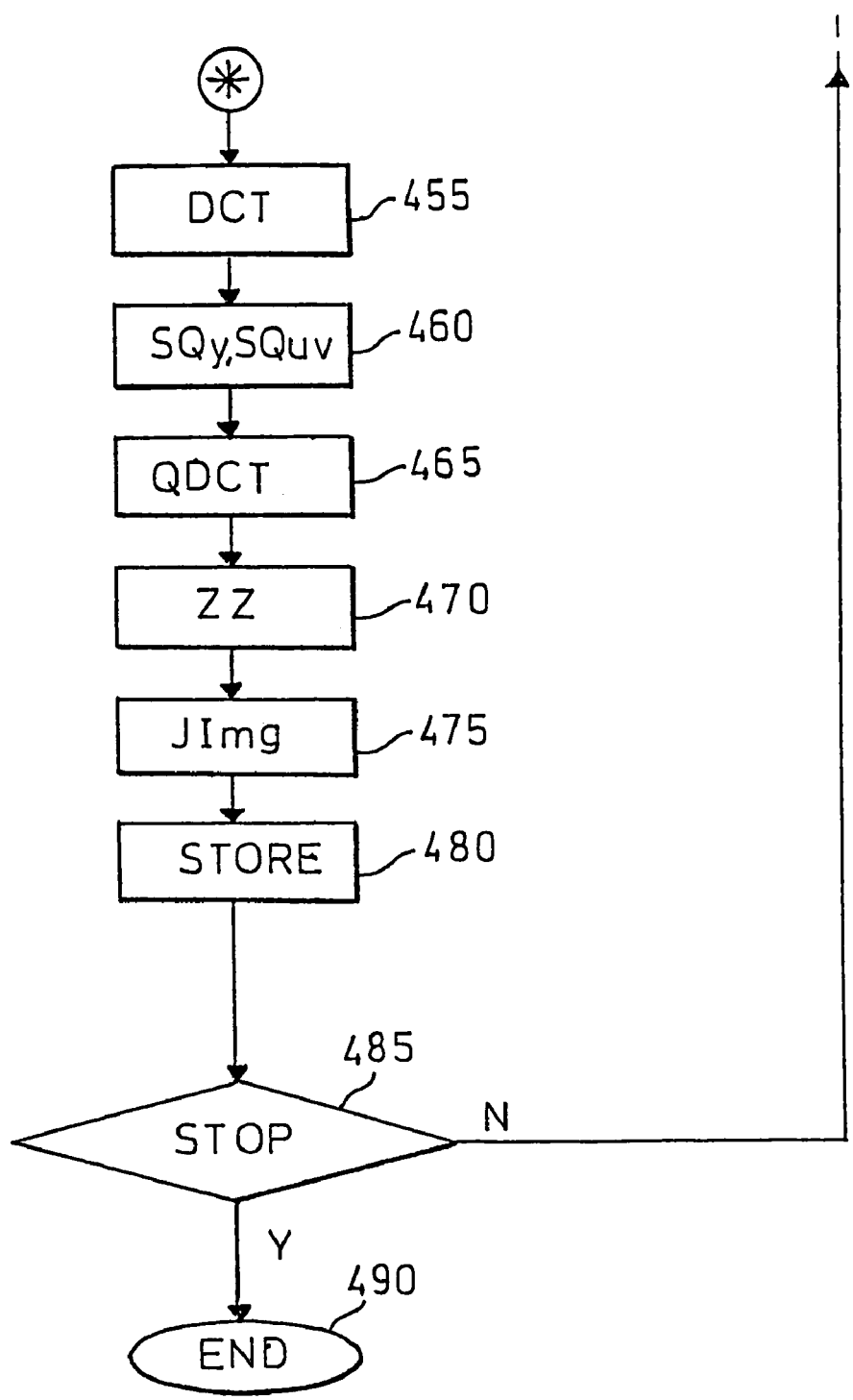
Figure 4C:
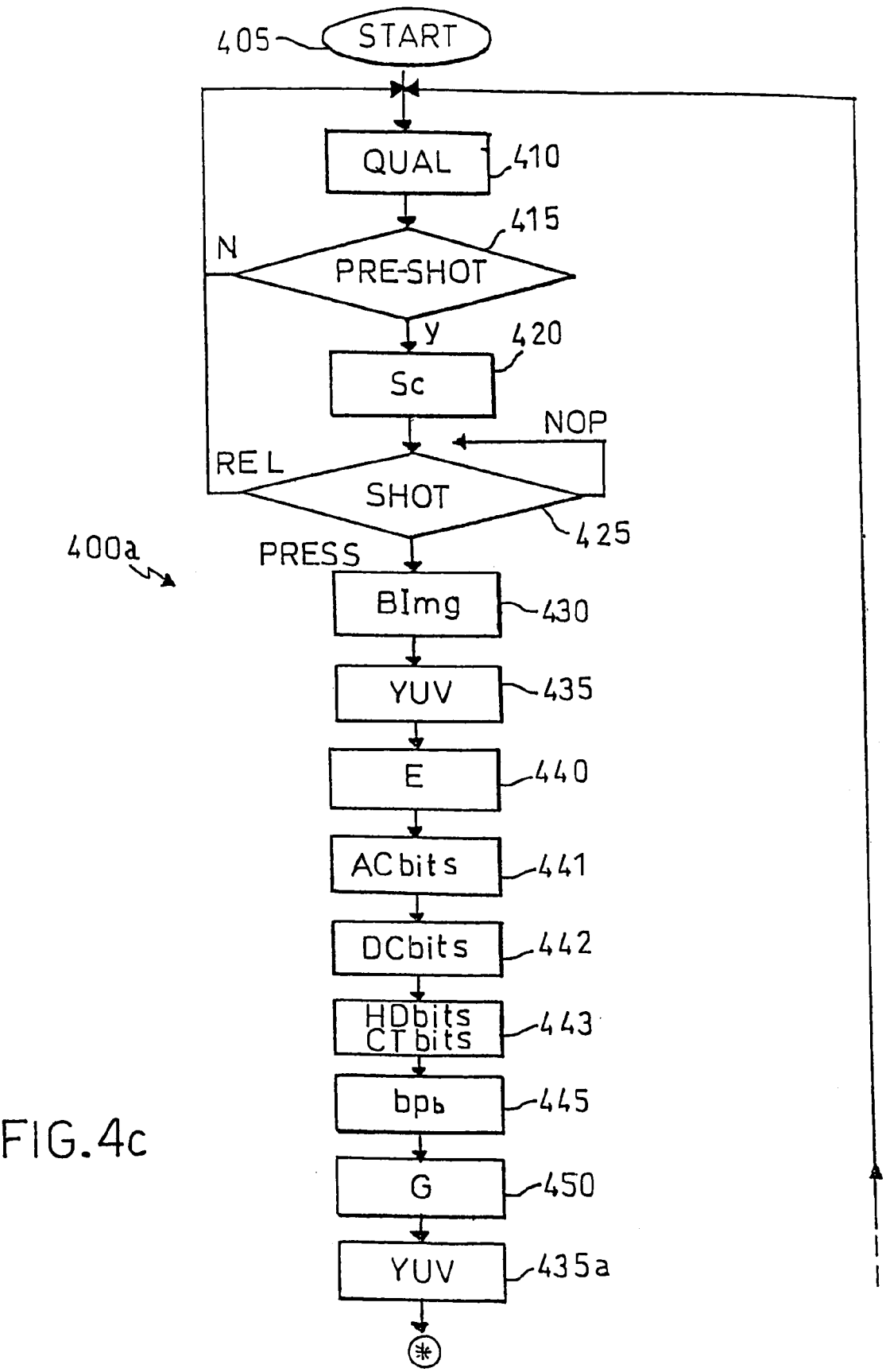
FIGS. 4c–4d are flow charts illustrating an alternative embodiment of the compression method according to the present invention.
Figure 4D:
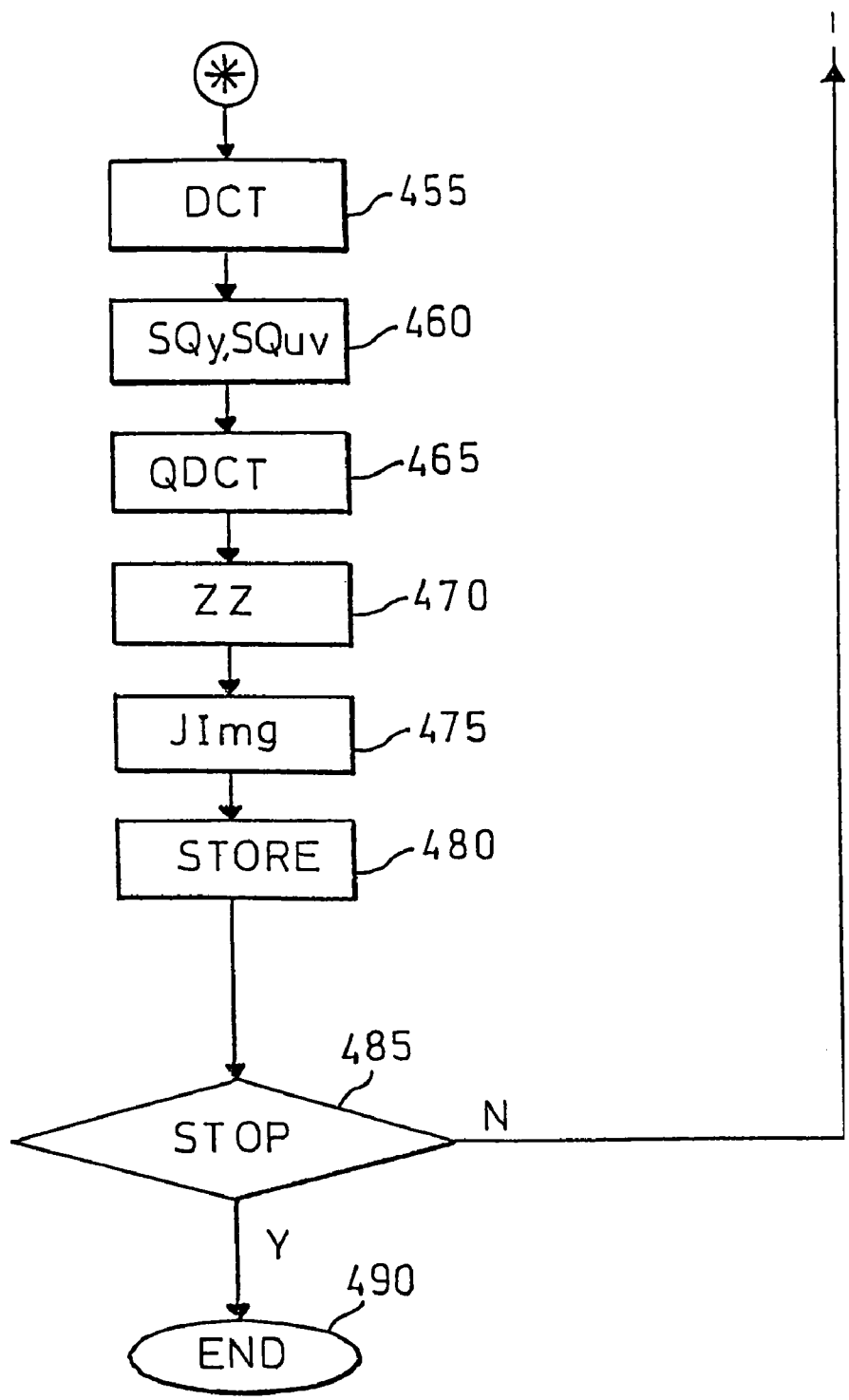

In an alternative embodiment of the present invention, as shown in FIGS. 4c–4d together with FIG. 1, the microprocessor 170 executes a method 400a which starts at block 405 and then goes until block 430 as described above.

In this case, however, the method sequentially passes to blocks 435, wherein the digital image YUV, provided by the image-processing unit 130, is sent to the bus 120. The method then executes the operations defined by blocks 440–450, wherein the energy unit 190 estimates the total energy measure E, and the microprocessor 170 estimates the number ACbits, calculates the number DCbits, calculates the numbers HDbits and CTbits, calculates the basic compression factor $bp_b$, and estimates the gain factor G.

At this point, the method continues to block 435a, wherein the incomplete digital image BImg is again read from the SDRAM 165 and processed by the image-processing unit 130 to obtain the digital image YUV, which is sent onto the bus 120 (as at block 435). The method then passes to block 455 and proceeds as in the method shown in FIGS. 4a–4b.

The approach described above provides the advantage of not requiring the digital image YUV to be stored in the SDRAM 165. This result is obtained with the trade-off of processing the incomplete digital image BImg twice by the image-processing unit 130. However, in many structures the time and the power consumption required for storing and reading the digital image YUV are higher then the ones required for processing the incomplete digital image BImg. Moreover, the approach described above is particularly advantageous when there are memory constraints in the camera.

Naturally, in order to satisfy local and specific requirements, a person skilled in the art may apply to the approach described above many modifications and alternatives all of which, however, are included within the scope of protection of the invention as defined by the following claims.

That which is claimed is:

1. A method for compressing a digital image comprising a matrix of elements, each element comprising a plurality of digital components of different types for representing a pixel, the method comprising:
   determining at least one energy measure of the digital image;
   estimating a gain factor as a function of the at least one energy measure, the function being determined experimentally according to a target compression factor;
   splitting the digital image into a plurality of blocks, and calculating for each block a group of discrete cosine transform (DCT) coefficients for the digital components of different types, each group of DCT coefficients comprising at least one direct current (DC) coefficient and a plurality of alternating current (AC) coefficients; and
   quantizing the DCT coefficients for each block using a corresponding quantization table scaled by the gain factor for achieving the target compression factor;
   wherein determining the at least one energy measure comprising receiving the plurality of digital components, and calculating the at least one energy measure in a pixel domain using the plurality of digital components;
   wherein estimating the gain factor comprises
      estimating a first number of bits required to encode the AC coefficients of all the blocks using the quantization tables scaled by a pre-set factor as a first function of the at least one energy measure, the first function being determined experimentally according to the target compression factor,
      calculating a second number of bits required to encode the DC coefficients of all the blocks using the quantization tables scaled by the pre-set factor,
      estimating a basic compression factor provided by the quantization tables scaled by the pre-set factor according to the first number of bits and the second number of bits, and
      estimating the gain factor as a second function of the basic compression factor, the second function being determined experimentally according to the target compression factor.

2. A method according to claim 1, wherein the first function is a linear function and the second function is a quadratic function.

3. A method according to claim 1, wherein estimating the basic compression factor comprises:
   estimating a third number of bits required to encode control values according to a number of elements of the digital image; and
   dividing a sum of the first, second and third number of bits by the number of elements of the digital image.

4. A method according to claim 1, further comprising:
   storing a plurality of sets of parameters representing the second function, each set of parameters being associated with a corresponding value of the target compression factor;
   selecting an image quality and determining a current value of the target compression factor as a function of the selected image quality; and
   reading the parameters associated with the current value of the target compression factor for estimating the gain factor.

5. A method according to claim 1, wherein the pre-set factor is determined experimentally according to the target compression factor.

6. A method according to claim 1, wherein each element of the digital image comprises a luminance component, a first chrominance component, and a second chrominance component.

7. A method according to claim 6, wherein the at least one energy measure comprises a total energy measure equal to a sum of an energy measure of the luminance components, an energy measure of the first chrominance components and an energy measure of the second chrominance components.

8. A method according to claim 7, wherein determining the at least one energy measure for each type of component comprises:
   calculating a horizontal Sobel image and a vertical Sobel image by a convolution of the elements of the digital image comprising a type of component with a horizontal mask and a vertical mask, respectively;
   calculating a total Sobel image by summing the horizontal Sobel image and the vertical Sobel image; and
   summing an absolute value of each element of the total Sobel image.

9. A method according to claim 8, wherein at least one quantization table is asymmetric along a horizontal direction and a vertical direction, the method further comprising multiplying the Sobel image associated with the at least one quantization table by a correction factor for compensating the asymmetry of the corresponding quantization table.

10. A method according to claim 1, further comprising:
    providing an incomplete digital image with at least one component missing in each element;
    obtaining the digital image from the incomplete digital image;
    storing the digital image in a memory and concurrently performing the determining of the at least one energy measure and the estimating of the gain factor; and
    reading the digital image from the memory for performing the splitting of the digital image and the quantizing of the DCT coefficients.

11. A method according to claim 1, further comprising:
    providing an incomplete digital image with at least one component missing in each element;
    obtaining the digital image from the incomplete digital image for performing the determining of the at least one energy measure and the estimating of the gain factor; and
    obtaining the digital image from the incomplete digital image again for performing the splitting of the digital image and the quantizing of the DCT coefficients.

12. A method for compressing a digital image comprising a matrix of elements, each element comprising a plurality of digital components of different types for representing a pixel, the method comprising:
    determining at least one energy measure of the digital image;
    estimating a gain factor as a function of the at least one energy measure by
       estimating a first number of bits required to encode the AC coefficients of all the blocks using the quantization tables scaled by a pre-set factor as a first function of the at least one energy measure,
       calculating a second number of bits required to encode the DC coefficients of all the blocks using the quantization tables scaled by the pre-set factor,
       estimating a basic compression factor provided by the quantization tables scaled by the pre-set factor according to the first number of bits and the second number of bits, and estimating the gain factor as a second function of the basic compression factor;

splitting the digital image into a plurality of blocks, and calculating for each block a group of discrete cosine transform (DCT) coefficients for the digital components of different types, each group of DCT coefficients comprising at least one direct current (DC) coefficient and a plurality of alternating current (AC) coefficients; and quantizing the DCT coefficients for each block using a corresponding quantization table scaled by the gain factor for determining a target compression factor;

wherein determining the at least one energy measure is performed in a pixel domain using the plurality of digital components.

13. A method according to claim 12, wherein the first and second functions are determined experimentally according to the target compression factor.

14. A method according to claim 12, wherein the first function is a linear function and the second function is a quadratic function.

15. A method according to claim 12, wherein estimating the basic compression factor comprises:

estimating a third number of bits required to encode control values according to a number of elements of the digital image; and dividing a sum of the first, second and third number of bits by the number of elements of the digital image.

16. A method according to claim 12, wherein each element of the digital image comprises a luminance component, a first chrominance component, and a second chrominance component.

17. A method according to claim 16, wherein the at least one energy measure comprises a total energy measure equal to a sum of an energy measure of the luminance components, an energy measure of the first chrominance components and an energy measure of the second chrominance components.

18. A method according to claim 17, wherein determining the at least one energy measure for each type of component comprises:

calculating a horizontal Sobel image and a vertical Sobel image by a convolution of the elements of the digital image comprising a type of component with a horizontal mask and a vertical mask, respectively;

calculating a total Sobel image by summing the horizontal Sobel image and the vertical Sobel image; and summing an absolute value of each element of the total Sobel image.

19. A device for compressing a digital image comprising a matrix of elements, each element comprising a plurality of digital components of different types for representing a pixel, the device comprising:

energy means for determining at least one energy measure of the digital image;

estimation means for estimating a gain factor as a function of the at least one energy measure, the function being determined experimentally according to the target compression factor;

discrete cosine transform (DCT) means for splitting the digital image into a plurality of blocks, and calculating for each block a group of coefficients for the digital components of different types, each group of DCT coefficients comprising at least one direct current (DC) coefficient and a plurality of alternating current (AC) coefficients;

quantization means connected to said DCT means for quantizing the DCT coefficients for each block using a corresponding quantization table scaled by the gain factor for achieving a target compression factor;

said energy means determining the at least one energy measure in a pixel domain using the plurality of digital components;

wherein said estimation means is for estimating a first number of bits required to encode the AC coefficients of all the blocks using the quantization tables scaled by a pre-set factor as a first function of the at least one energy measure, the first function being determined experimentally according to the target compression factor, calculating a second number of bits required to encode the DC coefficients of all the blocks using the quantization tables scaled by the pre-set factor, estimating a basic compression factor provided by the quantization tables scaled by the pre-set factor according to the first number of bits and the second number of bits, and estimating the gain factor as a second function of the basic compression factor, the second function being determined experimentally according to the target compression factor.

20. A device according to claim 19, wherein said DCT means and said quantization means define a compression unit; wherein said estimation means comprises a processor for controlling compression of the digital image; the device further comprising:

a memory for storing the quantization tables; and communication means for connecting said compression unit, said memory, said energy means and said processor together, said processor estimating the gain factor based upon a program stored in said memory.

21. A device according to claim 19, wherein the first function is a linear function and the second function is a quadratic function.

22. A device according to claim 19, wherein said estimation means for estimating the basic compression factor is further for:

estimating a third number of bits required to encode control values according to a number of elements of the digital image; and dividing a sun of the first, second and third number of bits by the number of elements of the digital image.

23. A device according to claim 19, wherein each element of the digital image comprises a luminance component, a first chrominance component, and a second chrominance component.

24. A device according to claim 23, wherein the at least one energy measure comprises a total energy measure equal to a sum of an energy measure of the luminance components, an energy measure of the first chrominance components and an energy measure of the second chrominance components.

25. A device according to claim 24, wherein said energy means is for:

calculating a horizontal Sobel image and a vertical Sobel image by a convolution of the elements of the digital image comprising a type of component with a horizontal mask and a vertical mask, respectively;

calculating a total Sobel image by summing the horizontal Sobel image and the vertical Sobel image; and summing an absolute value of each element of the total Sobel image.

26. A digital still camera comprising:

an image acquisition unit for transmitting light corresponding to an image of scene;

a sensor unit connected to said image acquisition unit for providing a digital image of scene, the digital image comprising a matrix of elements, each element comprising a plurality of digital components of different types for representing a pixel; and a control device for compressing the digital image and comprising a discrete cosine transform (DCT) circuit for splitting the digital image into a plurality of blocks, and calculating for each block a group of discrete cosine transform (DCT) coefficients for the digital components of different types, each group of DCT coefficients comprising at least one DC coefficient and a plurality of AC coefficients, a quantization circuit connected to said DCT circuit for quantizing the DCT coefficients for each block using a corresponding quantization table scaled by a gain factor for achieving a target compression factor, an energy circuit for determining at least one energy measure of the digital image, and a processor for estimating the gain factor as a function of the at least one energy measure, the function being determined experimentally according to the target compression factor, said processor estimating a first number of bits required to encode the AC coefficients of all the blocks using the quantization tables scaled by a pre-set factor as a first function of the at least one energy measure, the first function being determined experimentally according to the target compression factor;

calculating a second number of bits required to encode the DC coefficients of all the blocks using quantization tables scaled by the pre-set factor;

estimating a basic compression factor provided by the quantization tables scaled by the pro-set factor according to the first number of bits and the second number of bits; and estimating the gain factor as a second function of the basic compression factor, the second function being determined experimentally according to the target compression factor.

27. A digital still camera according to claim 26, wherein said DCT circuit and said quantization circuit define a compression unit; the device further comprising:

a memory for storing the quantization tables; and a communication bus for connecting said compression unit, said memory, said energy circuit and said processor together, said processor estimating the gain factor based upon a program stored in said memory.

28. A digital still camera according to claim 26, wherein the first function is a linear function and the second function is a quadratic function.

29. A digital still camera according to claim 26, wherein said estimation circuit for estimating the basic compression factor is further for:

estimating a third number of bits required to encode control values according to a number of elements of the digital image; and dividing a sum of the first, second and third number of bits by the number of elements of the digital image.

30. A digital still camera according to claim 26, wherein each element of the digital image comprises a luminance component, a first chrominance component, and a second chrominance component.

31. A digital still camera according to claim 30, wherein the at least one energy measure comprises a total energy measure equal to a sum of an energy measure of the luminance components, an energy measure of the first chrominance components and an energy measure of the second chrominance components.

32. A digital still camera according to claim 31, wherein said energy circuit is for:

calculating a horizontal Sobel image and a vertical Sobel image by a convolution of the elements of the digital image comprising a type of component with a horizontal mask and a vertical mask, respectively;

calculating a total Sobel image by summing the horizontal Sobel image and the vertical Sobel image; and summing an absolute value of each element of the total Sobel image.

* * * * *